Figure 1:
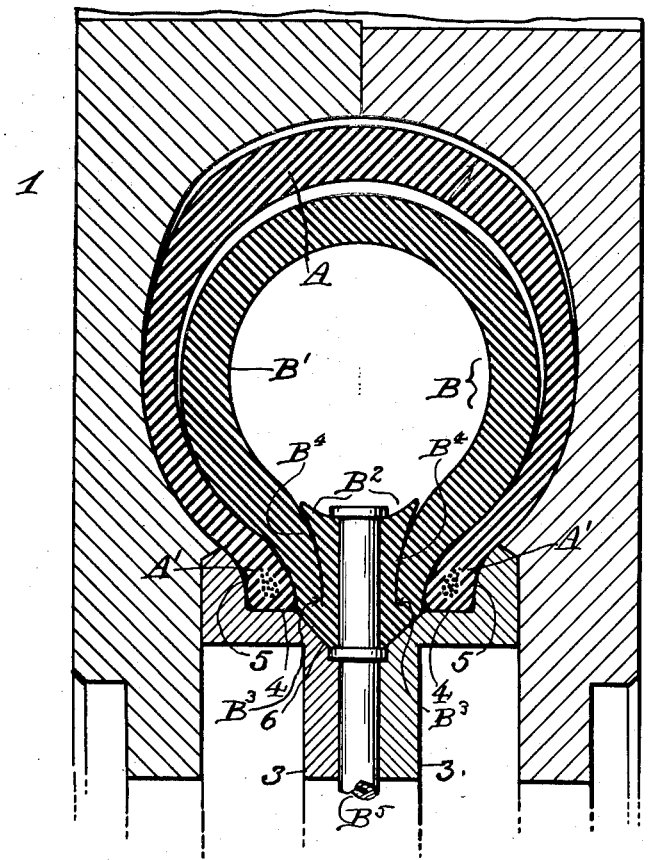

Patented Dec. 4, 1934

1,982,673

UNITED STATES PATENT OFFICE 1,982,673

INFLATABLE CURING BAG FOR TIRE CASINGS

Laurits A. Laursen, Akron, Ohio

Application April 4, 1932, Serial No. 602,956

7 Claims. (Cl. 18—45)

This invention relates to inflatable curing bags such as are used for vulcanizing tire casings in molds under internal fluid pressure.

As ordinarily constructed, these bags are made of rubber and comprise an annular tubular body portion with a solid base, the latter having a valve stem for the admission of the pressure fluid, which may be air, steam, water, or some other fluid. In vulcanizing a tire casing, the curing bag is first inserted within the casing, and the casing with the contained bag then placed in a suitable mold; thereafter, with the mold closed, the pressure fluid (usually heated) is admitted into the curing bag to expand the casing against the walls of the mold, and the mold is heated (by a steam jacket if of the individual vulcanizer variety, or by placing it within a pot heater if not steam jacketed) for the requisite time to effect vulcanization. In some instances, the tire casing is mounted on bead rings before being placed in the mold, while in other instances the bead rings are formed integral with the mold so as to effect the "rimming up" of the casing in the act of closing the mold. In either case, the bead rings form part of the mold during vulcanization, and it is quite important that the beads or bead portions (which, as will be understood, are more or less shapeless in the green or unvulcanized condition of the tire casing) be pressed firmly into their seats in the mold in order that they may be molded to proper shape during vulcanization.

Heretofore, the shaping of the bead portions has had to be performed mainly in the green or unvulcanized condition of the tire casing, since the form of the curing bag is such that the solid base portion occupies the whole of the bead zones, and hence the pressure fluid when admitted into the bag is incapable of exerting much, if any, influence on the shaping of the bead portions. In other words, when the tire casing is "rimmed up", the bead rings or the mold sections formed with the bead seats are drawn together to press the beads firmly against the solid base portion of the curing bag, and it is this pressure which is largely relied upon to force the bead portions into the mold seats to shape them, the subsequent vulcanization merely acting to give permanent form to the bead portions as thus shaped in the green or raw state. The success of this old practice has depended to a great extent upon the accuracy in making up the bead portions in the raw casing, care being taken that the proper volume of stock is allowed in building the casing, and that the stock is properly finished so as to avoid buckles or wrinkles or other irregularities.

Notwithstanding the extreme care which may thus be observed, it frequently happens that the finished beads are faulty, sometimes being too large or bulky, at other times too small or made with insufficient stock, and quite often wrinkled or buckled or otherwise irregularly formed or contoured. These faults are bound to be reflected in the vulcanized tire casing because the curing bag is totally incapable of remedying them. Thus, if the bead portions are too large, the stock, after filling up the bead seats, is caused to flow up along the inside of the tire casing into the region of the flexible tubular body portion, being squeezed or forced in that direction by the pressure applied by the solid and relatively unyielding base of the curing bag in the rimming up operation. On the other hand, if the bead portions are too small, the pressure of the curing bag base is insufficient to hold them in place during the expansion of the tire casing under the internal fluid pressure, and as a result the inner plies of the carcass are pulled up and away from the beads proper, producing a rounded toe effect in contrast to the sharp pointed toe which it is the aim to produce. In the case of wrinkles or buckles, the pressure of the curing bag base is of course non-uniform throughout the circumference of the beads, as it should be, and hence the cords of the carcass are stretched more in some places than in others, thus producing a non-uniform tension in the different cords of the tire casing in addition to causing misshaped beads.

These and other defects inherent in the regular form of curing bag are obviated by the present invention, which is directed to an improved form of bag capable not only of effecting a preliminary shaping of the bead portions during the rimming up process, but later during vulcanization of giving permanent shape to the bead portions under the influence of the internal fluid pressure which expands the tire casing as a whole. To this end, the improved bag (made preferably of rubber as usual) is formed so that the tubular body portion unites with the solid base portion along lines located radially inward of the outer circumference of the base, leaving at opposite sides of the base in the bead zones narrow channels or passages communicating with the interior of the bag.

According to this new construction, the side walls of the tubular body portion extend farther down than usual, being carried approximately to the toes of the beads, so that the high pressure maintained within the bag during vulcanization will be caused to force the side wall extensions outwardly and press the bead portions into their mold seats. Being flexible, the side wall extensions will conform themselves to any irregularities in the bead portions, yielding sufficiently to absorb any surplus stock if the bead portions are too large, or expanding sufficiently to compensate for any deficiency in stock if the bead portions are too small, and thus exerting a uniform pressure against the bead portions throughout their entire circumference. While thus made intentionally flexible, the side wall extensions of the bag will be amply supported by the solid base during the rimming up process, this support being necessary to insure the preliminary seating of the bead portions in the mold seats, as well as their preliminary shaping.

It is to be noted that this invention is clearly distinguishable from those instances in the prior art where thin walled inner tubes have been proposed for the vulcanization of tire casings, such tubes, of course, having no solid base portions, like the regular curing bag, which must be used in providing for the rimming up of the tire casing preparatory to vulcanization. Yet the invention gives to curing bags, otherwise of regular form, a degree of flexibility which is comparable to that possessed by such thin walled inner tubes.

Figure 2:
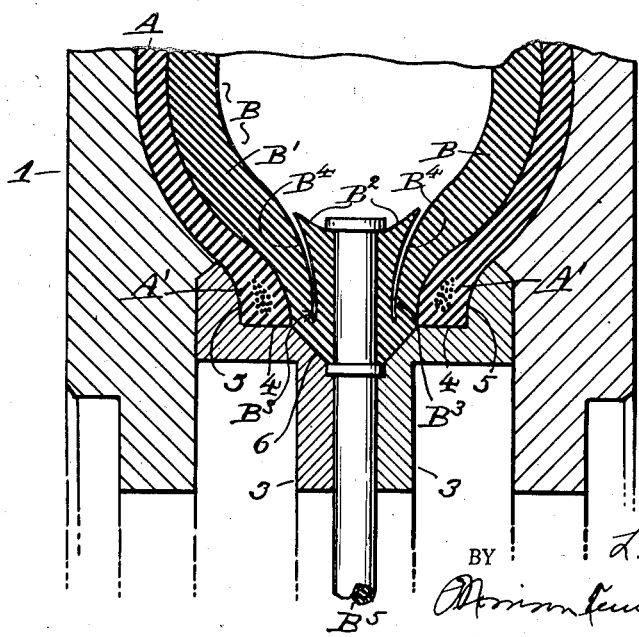

In the accompanying drawing:

Fig. 1 is a cross section of a vulcanizing mold, showing a tire casing with the improved form of air bag therein before it is expanded in the mold by the admission of fluid pressure into the bag; and Fig. 2 is a similar view, showing a tire casing fully expanded in the mold by fluid pressure admitted into the bag or the condition of the parts during or after vulcanization.

The vulcanizing mold herein shown is of standard construction, comprising top and bottom sections 1 and 2 formed with a suitable cavity which determines the final size and shape of the vulcanized tire casing. For non-skid casings, the mold sections will be formed with pockets or depressions to give the particular tread design desired, but these depressions have been omitted from the drawing for the sake of clearness.

In both figures, it will be observed that the tire casing A is shown as mounted upon a pair of bead rings 3, which when placed in the mold form a part thereof and which are formed with seats for the beads or bead portions $A^1$ of the casing, these seats being constituted by the plain cylindrical outer faces 4 of the rings and the curved inner faces 5 of the side flanges with which the rings are provided. Bolts or other suitable locking devices are employed to hold the two bead rings in contacting relation as shown.

Located within the tire casing is the improved form of curing bag B, which, as usual, is made of rubber and comprises an annular tubular body portion $B^1$ and a solid base $B^2$, the latter being shaped at its inner periphery to fit within the V-shaped channel 6 formed by the bead rings.

Ordinarily, the tubular body portion $B^1$ of the curing bag joins the solid base $B^2$ at the outer periphery or circumference of the latter, but according to the present invention, the tubular body portion is made to join the solid base along lines $B^3$ located radially inward of the outer circumference of the base, leaving at opposite sides thereof narrow annular channels or passages $B^4$ communicating with the interior of the bag. It is pointed out that the depth of these channels or passages $B^4$ is such as approximately to reach the toes of the bead portions $A^1$ of the tire casing, thus allowing the flexible side walls of the tubular body portion $B^1$ to be extended inwardly to a corresponding extent. In other words, the side walls of the tubular body portion $B^1$, instead of terminating at the outer circumference of the solid base $B^2$, as ordinarily, are extended radially inward so that their extended portions will occupy the bead zones of the tire casing.

As so constructed, the curing bag will function in the manner previously described. Thus, when the tire casing with the curing bag in place is mounted on the bead rings 3, the beads $A^1$ of the casing will be drawn inwardly against the solid base $B^2$, which, being relatively rigid, will press the bead portions into the mold seats formed by the faces 4 and 5 of the bead rings. In this rimming-up operation, the lower or extended portions of the side walls of the tubular body portion $B^1$, being flexible, will yield until they are pressed up against the solid base $B^2$, as shown by way of illustration in Fig. 1. Later, however, when the bag is inflated, the pressure fluid will enter the channels or passages $B^4$ and force the lower or extended portions of the side walls outwardly again to whatever extent the bead portions $A^1$ of the tire casing will permit, as indicated in Fig. 2.

In other words, the pressure fluid admitted into the curing bag is allowed to act directly against the bead portions to cause them to fill up the mold seats and to hold them therein during vulcanization. If the bead portions should be too large or bulky, the side walls of the bag will, because of their flexibility, yield to the required extent during the locking up process and then during vulcanization apply a uniform pressure throughout the bead portions to shape and mold them properly and without piling up the material. If the bead portions should be too small, the side walls will expand under the action of the pressure fluid and act similarly to shape and mold the beads during vulcanization. Moreover, the side walls will conform themselves to any wrinkles or buckles present in the bead zones, being flexible and elastic enough for that purpose. In short, the fluid pressure, being allowed to act directly in the bead zones, will exert the same pressure at the beads as at any other portion of the tire casing, with the result that all parts of the casing will be vulcanized under a uniform pressure.

The curing bag is provided as usual with a valve stem $B^5$ through which the pressure fluid is admitted during vulcanization. As before stated, this pressure fluid may be water, steam, air, or any other suitable fluid.

While in the embodiment illustrated the bead rings 3 are shown as separate from the mold sections 1 and 2, they could, if desired, be made integral with those sections, in which case the rimming up of the tire casing would take place during the act of closing the mold rather than as a separate preliminary operation. Again, while the improved curing bag has been herein described as composed wholly of rubber, it might be otherwise constituted so long as it is capable of performing its intended functions. Thus, the base instead of being of rubber could be made of metal so as to be completely rigid and the tubular body portion alone made of rubber. Moreover, while unnecessary, the base of the curing bag could be formed with holes or perforations leading from the narrow channels to the interior of the bag to insure the entrance of the pressure fluid into said channels, if desired.

These and other modifications will be readily appreciated by those skilled in the art.

Having thus described my invention, what I claim is:

1. An inflatable curing bag for tire casings having beads, said bag comprising an annular tubular body portion and a relatively rigid annular base, said body portion being united to the base along lines located radially inward of the outer circumference of the base so as to leave at opposite sides of the base in zones including the beads of the tire casings narrow channels or passages communicating with the interior of the bag, as and for the purpose described.

2. An inflatable curing bag for tire casings having beads, said bag comprising an annular flexible tubular body portion and a relatively rigid base, said base and body portion being separated from each other at opposite sides of the base in zones including the beads of the tire casings by annular narrow channels or passages communicating with the interior of the bag but closed to the exterior.

3. A sectional tire casing vulcanizing mold having bead seats, in combination with an inflatable curing bag for expanding a tire casing in the mold, said bag comprising an annular flexible tubular body portion adapted to fit the interior of the casing, and a relatively rigid annular base adapted to be positioned between the beads of the casing, said base and body portion being separated from each other at opposite sides of the base in zones including the beads of the tire casings by annular narrow channels or passages communicating with the interior of the bag but closed to the exterior thereof, whereby the bag in the rimming up of the casing may conform to the bead portions of the casing and at the same time offer sufficient rigidity to press the bead portions into the mold seats, and whereby the bag when inflated for the vulcanization of the casing may exert sufficient pressure to shape and mold the bead portions in the mold seats.

4. A sectional tire casing vulcanizing mold having bead seats, in combination with an integral inflatable curing bag for expanding a tire casing in the mold, said bag comprising flexible side walls in zones including the beads of the tire casing and a relatively rigid portion separated from but arranged to support said walls in such zones during the rimming up of the casing.

5. A curing bag according to claim 1, characterized by the fact that the tubular body portion is composed of rubber.

6. A curing bag according to claim 1, characterized by the fact that the tubular body portion and the base are both composed of rubber.

7. An integral inflatable curing bag for tire casings having beads, said bag comprising flexible side walls in zones including the beads of the tire casings, and a relatively rigid portion separated from but arranged to support said side walls in said zones for a limited yielding.

LAURITS A. LAURSEN.